United States Patent
Asai et al.

[11] Patent Number: 5,489,488
[45] Date of Patent: Feb. 6, 1996

[54] SOFT MAGNETIC FILM WITH COMPOSITIONAL MODULATION AND METHOD OF MANUFACTURING THE FILM

[75] Inventors: Hiroki Asai; Yuuji Omata, both of Osaka, Japan

[73] Assignee: Matsushita Electric Industrial Co., Ltd., Osaka, Japan

[21] Appl. No.: 161,301

[22] Filed: Dec. 2, 1993

[30] Foreign Application Priority Data

Dec. 2, 1992 [JP] Japan .................................. 4-322933

[51] Int. Cl.⁶ ........................... H01F 1/147; H01F 10/14; H01F 10/16
[52] U.S. Cl. ................ 428/611; 428/635; 428/636; 428/928; 428/935; 205/50; 205/103; 205/119; 205/176; 205/255
[58] Field of Search .......................... 205/50, 103, 119, 205/170, 176, 255; 428/635, 636, 638, 611, 928, 935

[56] References Cited

U.S. PATENT DOCUMENTS

| | | | |
|---|---|---|---|
| 2,470,775 | 7/1947 | Jemstedt et al. | 205/103 |
| 3,479,156 | 11/1969 | Ginder | 428/635 |
| 3,575,825 | 4/1971 | Skuda | 428/928 |
| 4,603,091 | 7/1986 | Mukasa et al. | 428/928 |
| 4,695,351 | 9/1987 | Mallary | 205/50 |
| 4,756,816 | 7/1988 | Liao et al. | 205/50 |
| 4,869,971 | 9/1989 | Nee et al. | 428/635 |

OTHER PUBLICATIONS

Sun et al., Plating with Pulsed and Periodic–Reverse Current, Metal Finishing, May 1979, pp. 33–38.
Jernstedt, PR Plating, pp. 1–6, Jul. 1948.

Primary Examiner—John Niebling
Assistant Examiner—Edna Wong
Attorney, Agent, or Firm—Lowe, Price, LeBlanc & Becker

[57] ABSTRACT

A soft magnetic multilayer film is manufactured by an electroplating process using an electrolyte containing metal ions. The soft magnetic multilayer film includes soft magnetic layers composed of elements, and deteriorated-soft magnetic layers composed of the same elements and alternating with the soft magnetic layers. The soft magnetic layers are preferably different in composition from the deteriorated-soft magnetic layers. In addition, it is preferable that the metal ions contained in the electrolyte include at least two of Ni ion, Co ion, and Fe ion.

9 Claims, 4 Drawing Sheets

SOFT MAGNETIC FILM WITH COMPOSITIONAL MODULATION AND METHOD OF MANUFACTURING THE FILM

BACKGROUND OF THE INVENTION

1. Field of the Invention

This invention relates to a soft magnetic film with compositional modulation, and a method of manufacturing the film. This invention also relates to a method of manufacturing a composition-modulated alloy film.

2. Description of the Prior Art

It is well-known in the art that "soft" is a term for defining a given magnetic property or characteristic of a substance.

Regarding magnetic heads for HDD's (hard disk drives), bulk heads have recently been replaced by thin-film magnetic heads. Generally, thin-film magnetic heads are manufactured by only thin-film forming processes. Thin-film magnetic heads include a coil, a coil insulating layer, and a film-shaped magnetic core. During the manufacture of the thin-film magnetic head, a soft magnetic film of the magnetic core is formed after the coil insulating layer is formed. Since the coil insulating layer is made of resin which will be deformed at a high temperature, it is necessary to form the soft magnetic film by a low temperature process. Accordingly, the formation of the soft magnetic film is usually based on electroplating. A typical soft magnetic film for a magnetic core is made of a permalloy (an Ni—Fe alloy).

A high recording density of a magnetic recording medium is desirable for a large-capacity and small-size HDD. A higher recording density generally requires a greater coercive force of a magnetic recording medium. To properly drive a magnetic recording medium having a great coercive force, it is good to increase the saturation magnetization of a soft magnetic film in a magnetic head. Accordingly, investigation has been given of cobalt-based soft magnetic films having great saturation magnetizations.

Electroplating is advantageous in that an apparatus for executing the electroplating is inexpensive. In addition, electroplating can be combined with photolithography. For example, during the manufacture of a thin-film magnetic head, a resin mask having a given magnetic core pattern is formed by photolithography, and then a soft magnetic film of the given magnetic core pattern is formed by electroplating while the resin mask is used. The photolithography enables a high accuracy of the shape of the soft magnetic film.

In thin-film magnetic heads, the volume of a film-shaped magnetic core is relatively small so that the sizes of magnetic domains in the core can not be ignored with respect to the size of the core. Thus, the characteristics of the thin-film magnetic heads are significantly affected by the behavior of magnetization in units of the magnetic domain sizes. During the operation of the thin-film magnetic head, the movement of magnetic domain walls causes "head noise". To suppress or prevent such head noise, it is effective to control the magnetic domain structure of the film-shaped magnetic core in the manufacture of the magnetic head.

A way of controlling the magnetic domain structure of the film-shaped magnetic core is to remove magnetic domains in a plane along the film of the core to provide a single-domain configuration. This way is effective especially in the case of a multilayer magnetic core having layers which are magnetically separated from each other in a direction along the thickness of the core. A known multilayer magnetic core has soft magnetic layers made of, for example, a permalloy, and nonmagnetic layers extending between the soft magnetic layers.

U.S. Pat. No. 4,869,971 discloses a process for electrodepositing a multilayer deposit on an electrically-conductive substrate from a single electrodeposition bath. The multilayer deposit includes a sequence of essentially repeating groups of layers. Each group of layers comprises a layer of a first electrodeposited material and a layer of a second electrodeposited material. The process in U.S. Pat. No. 4,869,971 includes the steps of immersing the substrate in an electrodeposition bath and repeatedly passing a charge burst of a first electric current and a second electric current through the electrodeposition bath to the substrate. The first electric current is a pulsed current with a first pulsed-on/off waveform and a first peak current density which is effective to electrodeposit the first electrodeposited material. The second electric current has a second waveform and a second current density which is effective to electrodeposit the second electrodeposited material. The duration of the charge bursts of the first and second electric currents is effective to form layers of the first and second electrodeposited material of desired thicknesses. U.S. Pat. No. 4,869,971 teaches that the copper contents of electrodeposited brass alloys vary as a function of the average current density of a plating current.

SUMMARY OF THE INVENTION

It is a first object of this invention to a soft magnetic film with compositional modulation.

It is a second object of this invention to provide a method of manufacturing a soft magnetic film with compositional modulation.

It is a third object of this invention to provide a method of manufacturing a composition-modulated alloy film.

A first aspect of this invention provides a soft magnetic multilayer film manufactured by an electroplating process using an electrolyte containing metal ions which comprises soft magnetic layers composed of elements; and deteriorated-soft magnetic layers composed of the same elements and alternating with the soft magnetic layers.

A second aspect of this invention provides a method of manufacturing a soft magnetic multilayer film by an electroplating process using an electrolyte containing metal ions which comprises the steps of a) forming a soft magnetic layer by electroplating which uses a normal-direction electric current; b) forming a second layer by supplying a reverse-direction electric current which is opposite in direction to the normal-direction current, the second layer being different in composition from the soft magnetic layer: and c) alternately repeating said steps a) and b) to laminate soft magnetic layers and second layers.

A third aspect of this invention provides a method in an electroplating system including an electroplating bath containing first and second metal ions different from each other, and first and second electrodes being at least partially placed in the electroplating bath, the method comprising the steps of a) passing a first electric current of a first direction through the first electrode, the electroplating bath, and the second electrode, and thereby electrodepositing a first alloy layer on the second electrode, the first alloy layer containing first and second metal elements corresponding to the first and second metal ions respectively; and b) after the step a), passing a second electric current of a second direction opposite to the first direction through the second electrode, the electroplating bath, and the first electrode, and thereby changing a surface portion of the first alloy layer into a second alloy layer containing the first and second metal elements corresponding to the first and second metal ions respectively, the second alloy layer being different in composition from the first alloy layer.

DESCRIPTION OF THE PREFERRED EMBODIMENTS

Figure 1:
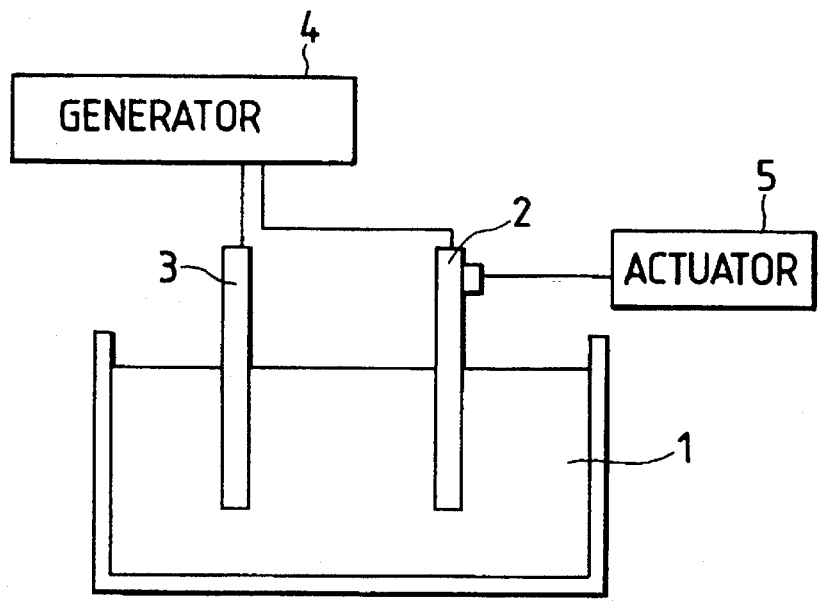
FIG. 1 is a diagram of an electroplating apparatus.

With reference to FIG. 1, an electroplating apparatus includes a container holding an electroplating bath 1. A pair of electrodes 2 and 3 extend into the electroplating bath 1. The electrode 2 is referred to as a sample electrode or a cathode on which a desired material is to be deposited. The other electrode 3 is referred to as a counter electrode or an anode.

A galvanostat or a current generator 4 is electrically connected between the sample electrode 2 and the counter electrode 3. The current generator 4 serves to pass an electric current through the counter electrode 3, the electroplating bath 1, and the sample electrode 2. An actuator 5 including a motor is mechanically connected to the sample electrode 2. The actuator 5 serves to vibrate the sample electrode 2 in the vertical direction at a frequency of 2 Hz.

The electroplating bath 1 is a permalloy electroplating bath or an electrolyte containing nickel (Ni) ion and iron (Fe) ion. It is well-known that nickel and iron can be electrodeposited as an alloy. The sample electrode 2 includes a glass substrate originally coated with a film of an Ni—Fe alloy which has a thickness of 120 nm. The Ni—Fe alloy film is formed on the glass substrate by a suitable process such as a vapor deposition process. The Ni—Fe alloy film on the glass substrate is electrically connected to the current generator 4. The counter electrode 3 includes a platinum mesh.

Figure 2:
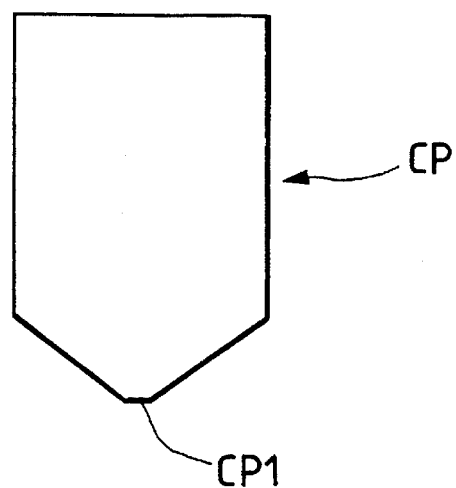
FIG. 2 is an illustration of a core pattern.

A soft magnetic multilayer film of a predetermined core pattern was formed on the sample electrode 2 as follows. The sample electrode 2 separated from the electroplating apparatus was coated with a resin mask or a resist having a predetermined core pattern CP by a photolithography-based process. As shown in FIG. 2, the core pattern CP had a narrowed or tapered edge portion CP1 adapted to face a magnetic recording medium (not shown). The core pattern CP had a predetermined area of, for example, 0.5 cm². The resin mask was composed of a film of insulating resin which had an opening corresponding to the core pattern CP. The Ni—Fe alloy film was exposed at the core pattern opening in the resin mask. The sample electrode 2 except the core pattern region was coated with the insulting mask film. Accordingly, the metals could be electrodeposited only on the core pattern region of the sample electrode 2.

The sample electrode 2 with the resin mask was set in the electroplating apparatus. The core pattern opening in the resin mask was placed in the electroplating bath 1. The Ni—Fe alloy film on the glass substrate was electrically connected to the current generator 4. Then, the electroplating apparatus was activated. Specifically, the actuator 5 was continuously activated so that the sample electrode 2 continued to be vibrated vertically at a frequency of 2 Hz. In addition, the current generator 4 was activated to pass an electric current through the counter electrode 3, the electroplating bath 1, and the sample electrode 2.

Figure 3:
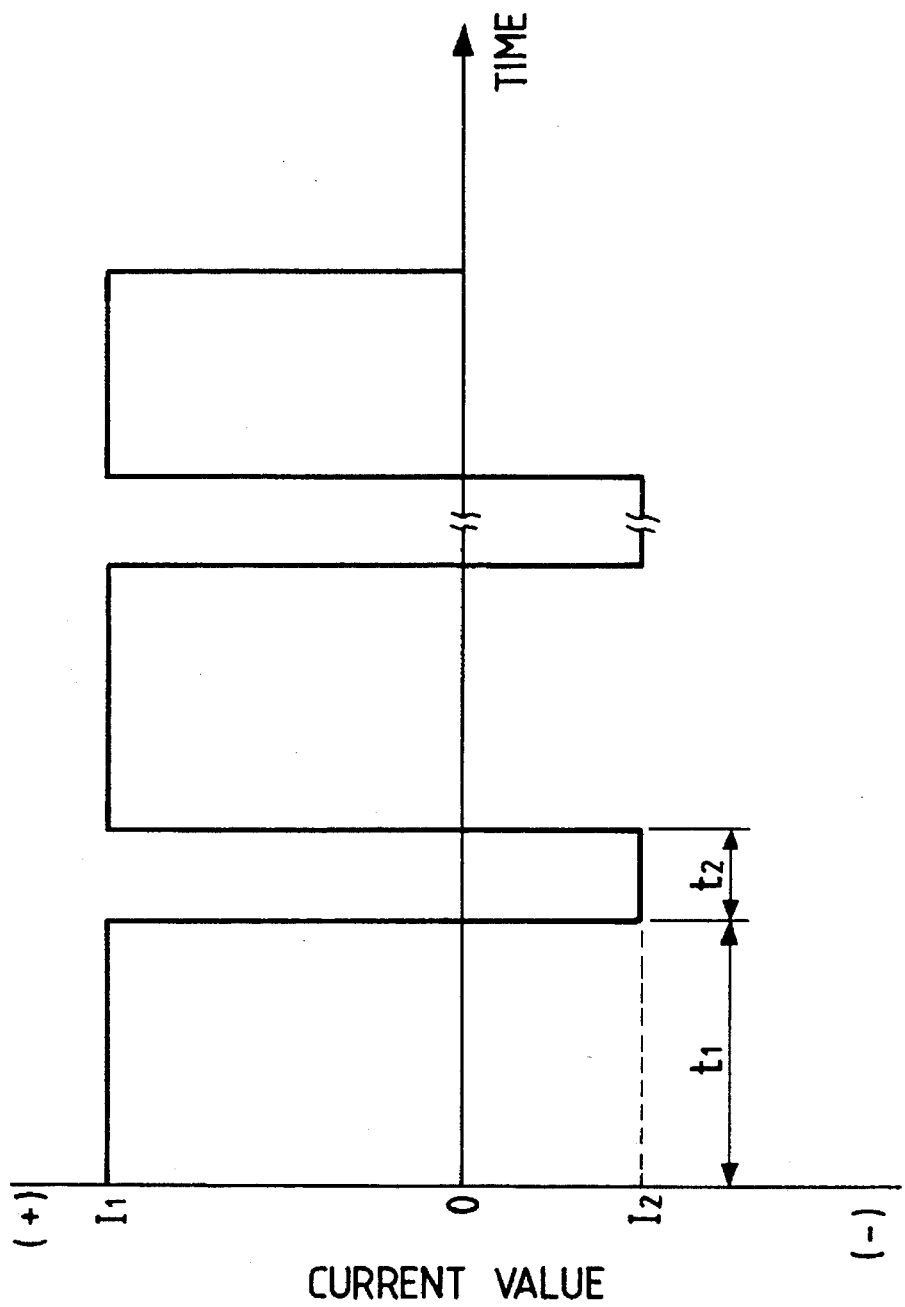
FIG. 3 is a time-domain diagram of an electric current which is generated in the electroplating apparatus of FIG. 1.

As shown in FIG. 3, during a first period t1, the current generator 4 passed a normal-direction current through the counter electrode 3, the electroplating bath 1, and the sample electrode 2. The normal-direction current remained at a predetermined magnitude or value I1. During a second period t2 following the first period t1, the current generator 4 passed a reverse-direction current through the sample electrode 2, the electroplating bath 1, and the counter electrode 3. The reverse-direction current remained at a predetermined magnitude or value I2. During a third period following the second period t2, the current generator 4 passed the normal-direction current through the counter electrode 3, the electroplating bath 1, and the sample electrode 2 as in the first period t1. During a fourth period following the third period, the current generator 4 passed the reverse-direction current through the sample electrode 2, the electroplating bath 1, and the counter electrode 3 as in the second period t2. These processes were repeated a predetermined number of times. For example, the supply of the reverse-direction current was periodically executed three times. During a final period, the current generator 4 passed the normal-direction current through the counter electrode 3, the electroplating bath 1, and the sample electrode 2 as in the first period t1. When the final period ended, the soft magnetic multilayer film was completed. Since the metals could be electrodeposited only on the core pattern region of the sample electrode 2, the shape of the completed soft magnetic multilayer film was essentially equal to the predetermined core pattern.

During each of the first period t1 and the later periods for which the normal-direction current was supplied, an Ni—Fe alloy layer was electrodeposited on the core pattern region of the sample electrode 2. During each of the second period t2 and the later periods for which the reverse-direction current was supplied, the exposed surface of the Ni—Fe alloy layer which was electrodeposited in the immediately preceding period was dissolved back into the electroplating bath 1, and simultaneously a surface portion of the Ni—Fe alloy layer was changed in composition from the remainder or the other portion (a deeper portion) thereof. Consequently, the Ni—Fe alloy layer was separated into two layers different in composition. The two layers are referred to as a first-type layer and a second-type layer respectively. The second-type layer extends at the surface portion of the original Ni—Fe alloy layer, and the first-type layer extends inward of the second-type layer.

Figure 4:
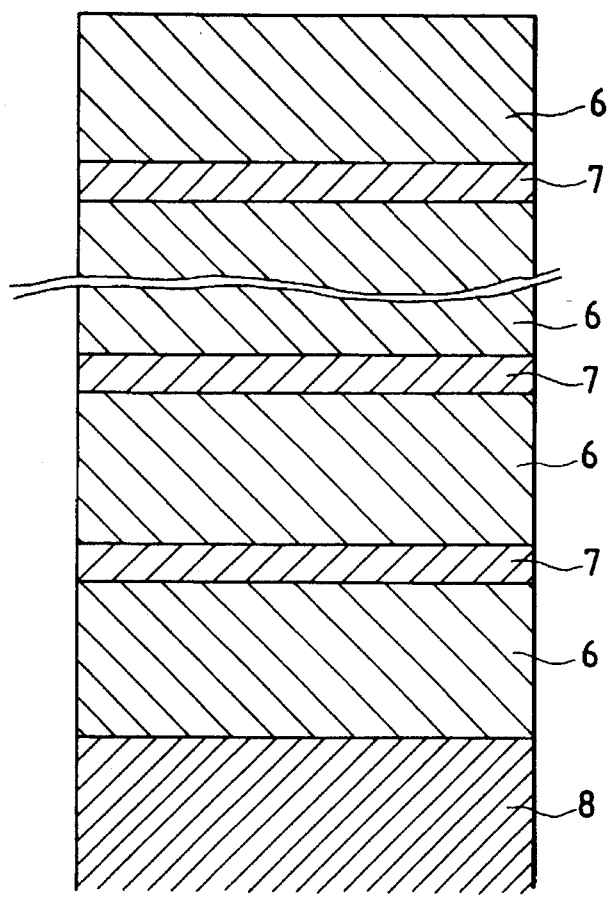
FIG. 4 is a sectional diagram of a soft magnetic multilayer film according to an embodiment of this invention.

FIG. 4 shows an example of the soft magnetic multilayer film made by the above-mentioned method. As shown in FIG. 4, the soft magnetic multilayer film includes a lamination in which first-type Ni—Fe alloy layers 6 alternate with second-type Ni—Fe alloy layers 7. The lowermost first-type Ni—Fe alloy layer 6 extends immediately above the glass substrate 8. An uppermost region of the soft magnetic multilayer film is occupied by the first-type Ni—Fe alloy layer 6. The first-type Ni—Fe alloy layers 6 are different in composition from the second-type Ni—Fe alloy layers 7. As previously described, the first-type Ni—Fe alloy layers 6 were made by the supply of the normal-direction current in the electroplating apparatus. The second-type Ni—Fe alloy layers 7 were made from the surface portions of the first-type Ni—Fe alloy layers 6 by the supply of the reverse-direction current in the electroplating apparatus.

Samples of the soft magnetic multilayer film were made by the above-mentioned method under different conditions. Each of the samples has a thickness of about 2 μm. Each of the samples has four first-type Ni—Fe alloy layers 6 and three second-type Ni—Fe alloy layers 7.

Figure 5A:
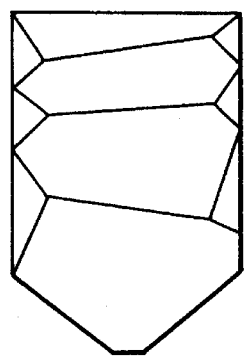
FIG. 5A is an illustration of a multiple-domain configuration in a surface of a soft magnetic multilayer film.
Figure 5B:
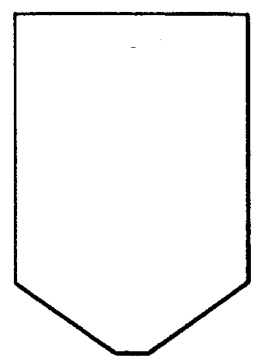
FIG. 5B is an illustration of a single-domain configuration in a surface of a soft magnetic multilayer film.

Specifically, a first sample of the soft magnetic multilayer film was made under conditions in which the value I1 of the normal-direction current was equal to 25 mA (corresponding to a current density of 50 mA/cm$^2$), and the value I2 of the reverse-direction current was equal to 20 mA (corresponding to a current density of 40 mA/cm$^2$). In addition, each of the first period t1 and the later periods for which the normal-direction current was supplied was equal to 240 seconds, and each of the second period t2 and the later periods for which the reverse-direction current was supplied was equal to 20 seconds. The first sample was experimentally analyzed. It was found from the result of the analysis that the nickel (Ni) content of each first-type Ni—Fe alloy layer 6 was equal to 81 at%, and the nickel (Ni) content of each second-type Ni—Fe alloy layer 7 was equal to 71at% in the first sample. In addition, a major part of the exposed surface of the first sample except portions of the edges thereof had only a single domain as shown in FIG. 5B. In the first example, the first-type Ni—Fe alloy layers 6 had good soft-magnetic properties while the second-type Ni—Fe alloy layers 7 had poor or deteriorated soft-magnetic properties. It is believed that magnetic discontinuities occur at the boundaries between the first-type Ni—Fe alloy layers 6 and the second-type Ni—Fe alloy layers, and the single domain in the surface of the first sample is caused by the magnetic discontinuities.

A second sample of the soft magnetic multilayer film was made under conditions in which the value I1 of the normal-direction current was equal to 25 mA (corresponding to a current density of 50 mA/cm$^2$), and the value I2 of the reverse-direction current was equal to 15 mA (corresponding to a current density of 30 mA/cm$^2$). In addition, each of the first period t1 and the later periods for which the normal-direction current was supplied was equal to 240 seconds, and each of the second period t2 and the later periods for which the reverse-direction current was supplied was equal to 30 seconds. The second sample was experimentally analyzed. It was found from the result of the analysis that the nickel (Ni) content of each first-type Ni—Fe alloy layer 6 was equal to 81 at%, and the nickel (Ni) content of each second-type Ni—Fe alloy layer 7 was equal to 75 at% in the second sample. In addition, a major part of the exposed surface of the second sample except portions of the edges thereof had only a single domain as shown in FIG. 5B.

A third staple of the soft magnetic multilayer film was made under conditions in which the value I1 of the normal-direction current was equal to 25 mA (corresponding to a current density of 50 mA/cm$^2$), and the value I2 of the reverse-direction current was equal to 10 mA (corresponding to a current density of 20 mA/cm$^2$). In addition, each of the first period t1 and the later periods for which the normal-direction current was supplied was equal to 240 seconds, and each of the second period t2 and the later periods for which the reverse-direction current was supplied was equal to 45 seconds. The third sample was experimentally analyzed. It was found from the result of the analysis that the nickel (Ni) content of each first-type Ni—Fe alloy layer 6 was equal to 81 at%, and the nickel (Ni) content of each second-type Ni—Fe alloy layer 7 was equal to 78 at% in the third sample. In addition, the exposed surface of the third sample had a plurality of magnetic domains. FIG. 5A shows an example of such a multiple-domain configuration.

A fourth sample of the soft magnetic multilayer film was made under conditions in which the value I1 of the normal-direction current was equal to 25 mA (corresponding to a current density of 50 mA/cm$^2$), and the value I2 of the reverse-direction current was equal to 5 mA (corresponding to a current density of 10 mA/cm$^2$). In addition, each of the first period t1 and the later periods for which the normal-direction current was supplied was equal to 240 seconds, and each of the second period t2 and the later periods for which the reverse-direction current was supplied was equal to 95 seconds. The fourth sample was experimentally analyzed. It was found from the result of the analysis that the nickel (Ni) content of each first-type Ni—Fe alloy layer 6 was equal to 81 at%, and the nickel (Ni) content of each second-type Ni—Fe alloy layer 7 was equal to 80 at% in the fourth sample. In addition, the exposed surface of the fourth sample had a plurality of magnetic domains. FIG. 5A shows an example of such a multiple-domain configuration.

As understood from the previous description, the nickel (Ni) content of a second-type Ni—Fe alloy layer 7 decreases from that of a first-type Ni—Fe alloy layer 6 as the value I2 of the reverse-direction current increases. For a single-domain configuration, it is preferable that the value I2 of the reverse-direction current is equal to or greater than 15 mA. In other words, the current density of the reverse-direction current is preferably equal to or greater than 30 mA/cm$^2$.

The previously-described method may be applied to the fabrication of multilayer rims including alloys other than Ni—Fe alloys. For example, the previously-described method may be applied to the fabrication of a soft magnetic multilayer film including first-type Ni—Fe—Co alloy layers and second-type Ni—Fe—Co alloy layers. In this case, an electroplating bath 1 contains cobalt (Co) ion in addition to nickel (Ni) ion and iron (Fe) ion. Furthermore, the previously-described method may be applied to the fabrication of a soft magnetic multilayer film including first-type Co—Fe alloy layers and second-type Co—Fe alloy layers. In this case, an electroplating bath 1 contains cobalt (Co) ion and iron (Fe) ion.

Figure 6:
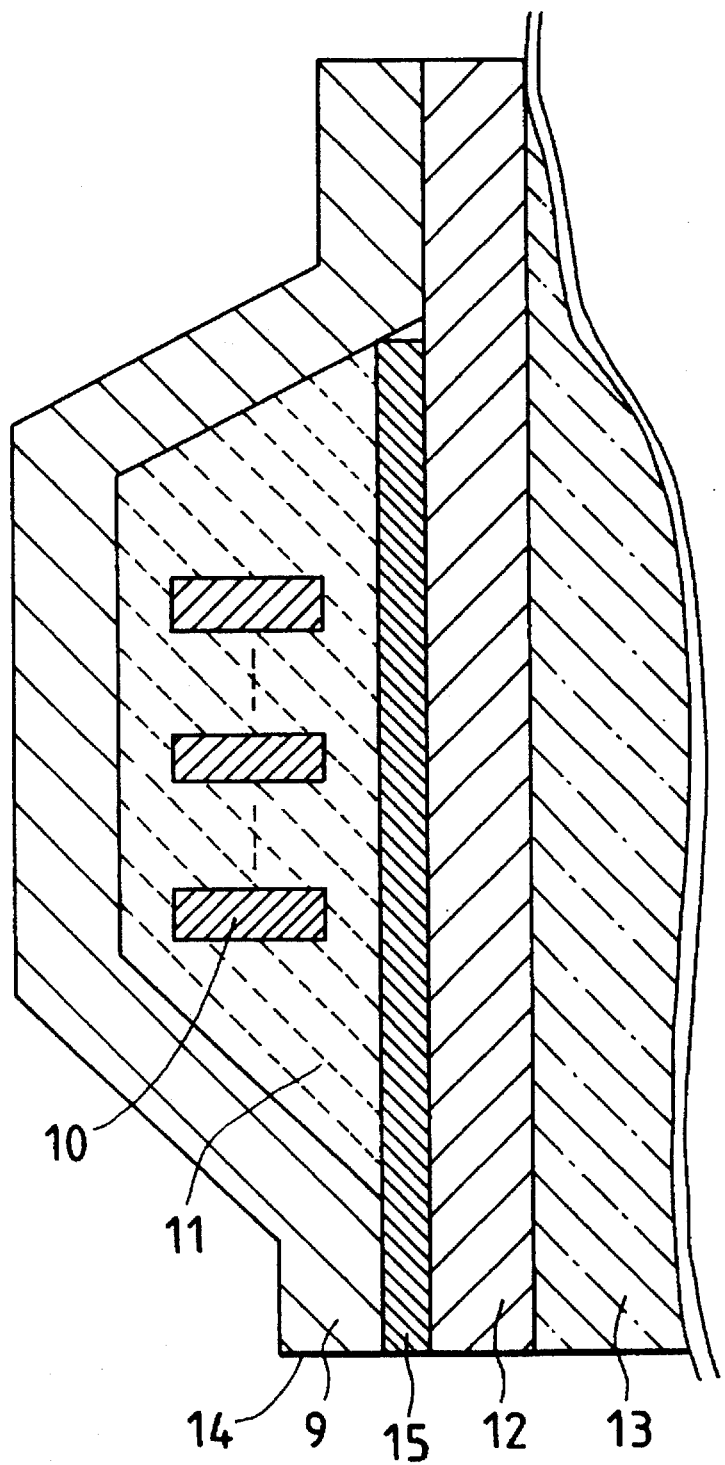
FIG. 6 is a sectional view of a thin-film magnetic head.

With reference to FIG. 6, a thin-film magnetic head includes a substrate 13 having a surface coated with an inner magnetic core 12. The inner magnetic core 12 has a soft magnetic multilayer film made by the previously-described method. The magnetic head includes an outer magnetic core 9. The outer magnetic core 9 has a soft magnetic multilayer film made by the previously-described method. Thus, a magnetic core portion of the magnetic head of FIG. 6 uses multilayer films of this invention. The inner magnetic core 12 and the outer magnetic core 9 define an inner space therebetween which is filled with a coil insulating layer 11 and a magnetic gap insulating layer 15. Coils 10 are held within the coil insulating layer 11. In FIG. 6, upper edges of the inner magnetic core 12 and the outer magnetic core 9 are connected to each other while lower edges of the inner magnetic core 12 and the outer magnetic core 9 are separated by a given gap occupied by the magnetic gap insulating layer 15. In FIG. 6, the outer magnetic core 9, the magnetic gap insulating layer 15, the inner magnetic core 12, and the substrate 13 define a lower flat surface 14 of the magnetic head which normally faces a magnetic recording medium (not shown).

The thin-film magnetic head of FIG. 6 was fabricated as follows. First, a soft magnetic multilayer film constituting the inner magnetic core 12 was formed on the substrate 13 by the previously-described method using the electroplating process. The substrate 13 with the inner magnetic core 12 was removed from the electroplating apparatus, and then a magnetic gap insulating layer 15, coils 10, and a coil insulating layer 11 were provided on the inner magnetic core 12 by a suitable process including a deposition process. Subsequently, exposed areas on the substrate 13 were coated with an alloy film by a vapor deposition process. An insulating mask or a resin mask having a predetermined core pattern was formed on the alloy film by a photolithography-based process. The substrate with the alloy film and the resin mask was set in the electroplating apparatus, and a soft magnetic multilayer film constituting the outer magnetic core 9 was electrodeposited in a core pattern opening of the resin mask by the previously-described method. As a result, the thin-film magnetic head was completed.

What is claimed is:

1. A soft magnetic multilayer film manufactured by an electroplating process using an eletrolyte containing metal ions, comprising:

first soft magnetic layers comprised of a first ratio or elements; and second soft magnetic layers comprised of a second ratio of said elements and alternating with the first soft magnetic layers, the second soft magnetic layers having a deteriorated magnetic property relative to the first soft magnetic layers and said second ratio differing from said first ratio;

wherein original soft magnetic alloy layers comprised of said elements are formed by deposition, the second soft magnetic layers are formed from the original soft magnetic layers by dissolution of a portion of at least one element of the original soft magnetic alloy layers, and the first soft magnetic layers comprise nondissolved original soft magnetic alloy layers;

and further wherein the metal ions contained in the electrolyte include at least two metal ions selected from the group consisting of Ni ion, Co ion and Fe ion, and said elements include at least two metals selected from the group consisting of Ni, Co and Fe.

2. A method of manufacturing a soft magnetic multilayer film by an electroplating process using an electrolyte containing metal ions, comprising the steps of:

a) forming a soft magnetic alloy layer by electroplating using a first direction electric current;

b) forming a second layer by dissolution of a portion of at least one element in the surface of the soft magnetic alloy layer, wherein said dissolution is achieved by supplying a second direction electric current which is opposite in the direction to the first direction current, the second layer being different in its ratio of alloy elements as compared with a ratio of alloy elements of the soft magnetic layer; and c) alternately repeating said steps a) and b) to laminate soft magnetic layers and second layers.

3. The method of claim 2, wherein the metal ions contained in the electrolyte include at least two metal ions selected from the group consisting of Ni ion, Co ion, and Fe ion.

4. The method of claim 2, wherein a composition of second layers varies as a function of a magnitude of the second direction electric current.

5. The method of claim 2, wherein at least one of the soft magnetic layers has only a single domain.

6. The method of claim 5, wherein the soft magnetic layers and the second layers are made of Ni—Fe alloys.

7. The method of claim 6, wherein the second direction current has a density equal to or greater than 30 mA/cm$^2$.

8. An electroplating method, comprising the steps of:

a) providing an electroplating bath containing first and second metal ions different from each other, and first and second electrodes at least partially placed in the electroplating bath;

b) passing a first electric current of a first direction through the first electrode, the electroplating bath and the second electrode, thereby electrodepositing a first alloy layer on the second electrode, the first alloy layer containing first and second metal elements corresponding to the first and second metal ions, respectively; and c) after the step b), passing a second electric current of a second direction opposite to the first direction through the second electrode, the electroplating bath and the first electrode to dissolve a portion of at least one element in the first alloy layer, thereby changing a surface portion of the first alloy layer into a second alloy layer containing the first and second metal elements corresponding to the first and second metal ions, respectively, the second alloy layer containing a ratio of said first and second metal elements different from a ratio of said first and second metal elements of the first alloy layer.

9. The method of claim 2, wherein said step b) comprises maintaining the supply of the second direction electric current for a time period equal to or longer than 20 seconds.

* * * * *